Oct. 25, 1938.  L. TURCHÁNYI  2,134,063
RUBBER TOY
Filed Oct. 21, 1937
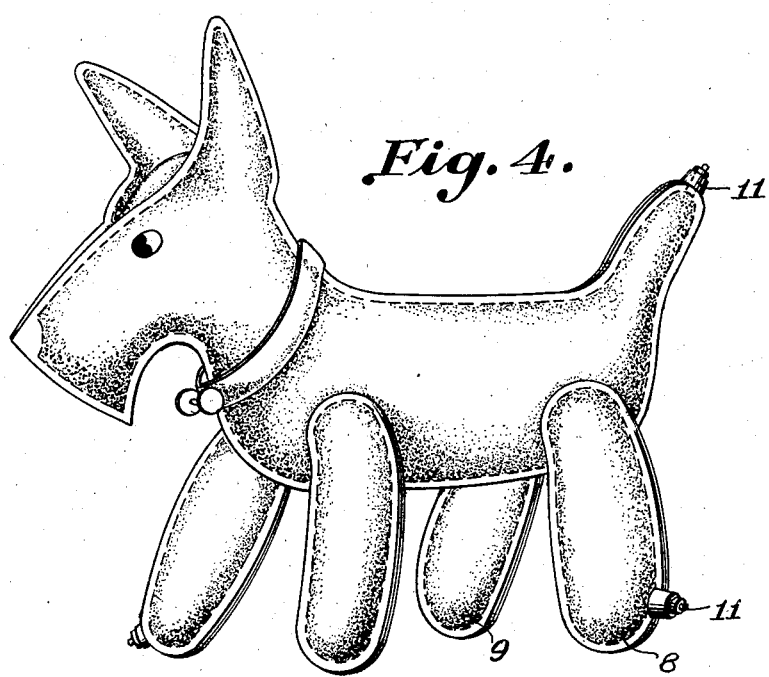
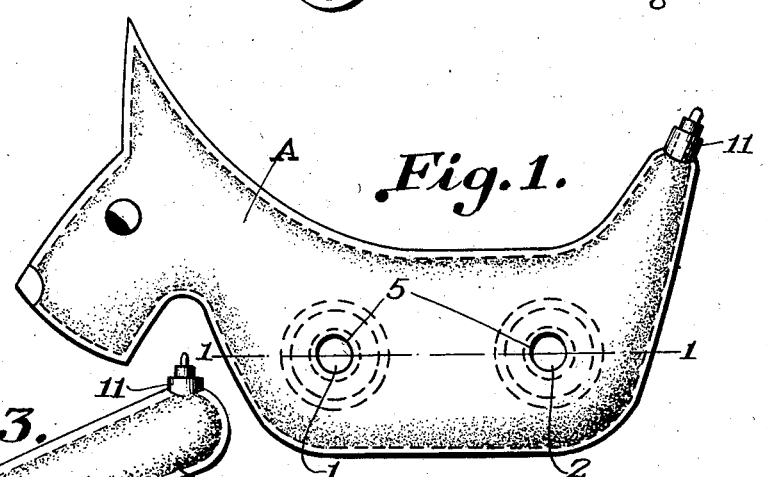
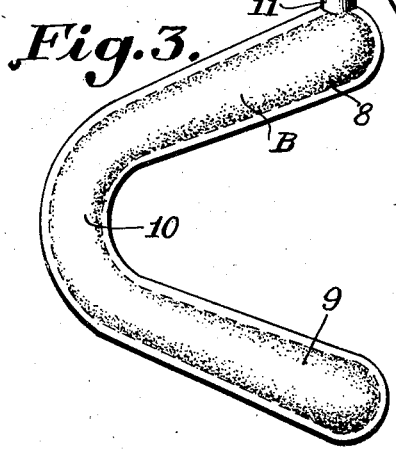
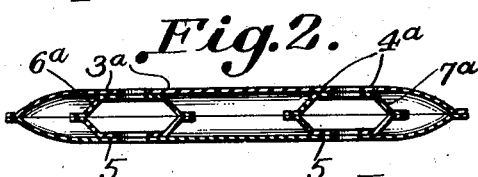
Inventor.
Laszlo Turchanyi
By Mock & Blum
Attorneys.

Patented Oct. 25, 1938

2,134,063

UNITED STATES PATENT OFFICE 2,134,063

RUBBER TOY

László Turchányi, Sashalom, near Budapest, Hungary, assignor to Magyar Ruggyantaarugyar, Resxvenytarsasag, Budapest, Hungary Application October 21, 1937, Serial No. 170,177
In Hungary October 22, 1936

6 Claims. (Cl. 46—87)

Inflatable hollow bodies particularly rubber toys have been produced by stamp-welding along the edges of two suitably cut out rubber sheets of similar shape and by subsequently vulcanizing. In view of the fact that the stamp-welding of the sheets has comprised also the protruding body portions of the trunk, such as limbs, hands and feet, ears and the like, lying all in one place, a sack-shaped body was obtained after inflation which was rather remote from the natural appearance of the figure.

In order to improve the natural appearance of the figure, inflatable hollow bodies had been produced later in such manner that between two side sheets cut out corresponding to the contours of the body in side view, folded insertion pieces have been introduced at such places, where the continuations, such as limbs, ears, or the like, at the two sides of the plane of the seam were to be formed. It has further been known to manufacture from four thin rubber sheets inflatable rubber hollow bodies reproducing a very natural appearance of the figures in such manner that an insertion piece has been introduced between two outer rubber sheets, said insertion piece consisting of a two-lobed flat ring. In another line of development the trunk of the inflatable body consisting of two sheets has been provided with stuck-on limbs.

In these processes for obtaining natural appearance of the figure by employing more than two rubber sheets, rather complicated and expensive tools have been required, whereby the stamping-out of the parts lying between the side sheets has caused considerable waste. Besides all earlier solutions were characterized by a certain stiffness of the limbs when stamped together with or stuck onto the trunk.

The hollow rubber body according to the invention consists of an inflatable trunk and of inflatable body portions, such as limbs, which are independent from the trunk and are movably connected therewith.

I have found now that even the most simple inflatable hollow bodies consisting of two sheets only can be produced with a proper natural appearance if at suitable places of the inflatable trunk of the figure obtained by stamp-welding two rubber sheets, for instance, at the starting points of the limbs, ears, etc., openings are stamped out through which inflatable elements, such as pairs of limbs, ears, etc. also consisting for instance of two sheets welded at their edges, are pulled in.

In order to prevent the impairment of the uniform inflation by the welding of the rubber sheets along the side openings, the trunk of the body is produced in such manner that onto one of the unvulcanized rubber sheets forming part of the trunk, discs obtained by stamp-welding two unvulcanized circular rubber pieces at their edges are placed where the openings are to be formed, whereupon the other unvulcanized rubber sheet forming part of the trunk is superposed. Then the contour of the trunk and preferably at the same time the openings provided for drawing in the limbs are stamped out also, whereby the known means for preventing sticking are used. Finally the figure is vulcanized. By stamp-welding along the openings the lower sheet of the double circular disc with the lower side sheet of the trunk and respectively the upper sheet with the top sheet of the trunk, the sheets of the circular discs move when inflated in the manner of an accordion. By changing the diameter of the circular discs, the extent of the inflation in the neighborhood of the side openings can be regulated in any manner desired.

The introduced elements form after being inflated, the limbs of the body, and due to their mobility and to the possibility of changing their position, they enable a greatly varied execution of the new toys. For instance quadruped figures may sit or stand, and by changing the position of the limbs of the figures numerous different effects may be obtained.

One example of the hollow body according to the invention is shown on the enclosed drawing. Fig. 1 is an upper view of the inflatable trunk of a dog, Fig. 2 a cross section of the trunk along line I—I of Fig. 1, Fig. 3 the upper view of the front feet, all in uninflated condition. Fig. 4 is the perspective view of the same dog in its inflated condition.

Referring to Figs. 1 and 2, the trunk of the dog or other animal to be formed, consists of two large rubber sheets A superposed on each other. Discs 6a and 7a, formed by stamp-welding two unvulcanized circular small rubber sheets at their peripheries are placed between said sheets A at the points where the limbs of the animal are to be introduced, indicated on the drawing by the reference letters 3a and 4a. Openings 1 and 2 are then stamped into the superimposed four rubber sheets at the places for introducing the limbs of the animal and parts 3a and 4a of the rubber sheets A surrounding the openings 1 and 2 are stamp-welded along seam 5 together with sheets 6a and 7a. At the same time the openings 1 and 2 are stamped out, the contour of the trunk is also stamped out. The rubber sheets A are stamp-welded along their edges and the animal formed is then finally vulcanized. It will be noted from Fig. 2, that by stamp-welding the sheets A and the rubber discs 6a and 7a along seam 5, the sheets of said circular discs 6a and 7a move when inflated in the manner of an accordion.

The pairs of limbs according to Fig. 3 consist of the stamp-welded two rubber sheets B. The limbs 8 and 9 which are connected to each other by the narrow channel 10 are formed preferably in such manner that their diameter considerably exceeds in inflated condition that of the trunk opening so that thereby the slipping of the introduced limbs from the trunk is prevented. The trunk as well as the limbs of the figures according to the invention are each provided with inflating tubes 11, their cavities being independent from each other. The inflating tube is marked with 11 in the drawing.

In accordance with the invention figures of natural appearance can be obtained; but the invention is adapted also for the manufacture of odd and grotesque figures.

Obviously the drawing shows only one embodiment of the invention and the scope of the patent is in no way confined thereto. The figure in accordance with the invention can be combined with any other known executions; for instance the limbs of the figure can in accordance with the drawing be introduced into the openings of the trunk and at the same time the ears may be formed by insertions applied between the side sheets.

Having now particularly described and ascertained the nature of my said invention and in what manner the same is to be performed, I declare that what I claim is:

1. An inflatable rubber body comprising two welded rubber sheets having openings therein and means adapted for lastingly inflating said body, one or more openings of one sheet being located opposite the respective openings of the other sheet, means for insulating the major part of the interior of the rubber body against entrance of air through said openings and independent inflatable members in said openings adapted to move freely in said openings.

2. An inflatable rubber body comprising two welded rubber sheets having openings therein and means adapted for lastingly inflating said body, one or more openings of one sheet being located opposite the respective openings of the other sheet, means for insulating the major part of the interior of the rubber body against entrance of air through said openings and independent inflatable members in said openings adapted to move freely in the respective openings, each of said members having means adapted for maintaining inflation.

3. An inflatable rubber body comprising two welded rubber sheets having openings therein and means adapted for lastingly keeping said body inflated, one or more openings of one sheet being located opposite the respective openings of the other sheet, means for insulating the major part of the interior of said rubber body against entrance of air through said openings and independent inflatable members in said openings adapted to move in each of said openings, each of said members comprising two welded rubber sheets.

4. An inflatable rubber body comprising two welded rubber sheets having openings therein and means adapted for lastingly keeping said body inflated, one or more openings of one sheet being located opposite the respective openings of the other sheet, means for insulating the major part of the interior of said rubber body against entrance of air through said openings and independent inflatable members in said openings adapted to move freely in said openings, each of said members comprising two welded rubber sheets and having means adapted for maintaining inflation.

5. An inflatable rubber body comprising two welded rubber sheets having openings therein and means adapted for lastingly keeping said body inflated, one or more openings of one of said sheets being located opposite respective openings of the other of said sheets, means for insulating the major part of the interior of said rubber body against entrance of air through said openings and independent inflatable members in said openings adapted to move freely in each of said openings, each of said members having means adapted for maintaining inflation, each inflated member having an outside diameter larger than the size of the body openings in which it is movable.

6. A rubber toy comprising an inflatable trunk having a transverse airtight opening or openings and one or more inflated members passing through each of said openings and extending from both sides of said trunk, said members being adapted to freely turn in their respective openings.

LÁSZLÓ TURCHÁNYI.